United States Patent
Fox et al.

(10) Patent No.: US 6,994,651 B2
(45) Date of Patent: Feb. 7, 2006

(54) EPICYCLIC GEAR SYSTEM

(75) Inventors: Gerald P. Fox, Massillon, OH (US); Eric Jallat, Illkirch-Graffenstaden (FR)

(73) Assignee: The Timken Company, Canton, OH (US)

( * ) Notice: Subject to any disclaimer, the term of this patent is extended or adjusted under 35 U.S.C. 154(b) by 0 days.

(21) Appl. No.: 10/680,043

(22) Filed: Oct. 7, 2003

(65) Prior Publication Data
US 2005/0075211 A1    Apr. 7, 2005

(51) Int. Cl.
F16H 57/08    (2006.01)

(52) U.S. Cl. ................................ 475/335; 475/348

(58) Field of Classification Search ............... 475/331, 475/334, 335, 346, 348
See application file for complete search history.

(56) References Cited

U.S. PATENT DOCUMENTS

| | | | |
|---|---|---|---|
| 3,178,966 A | * | 4/1965 | Wildhaber ............... 475/346 |
| 3,303,713 A | | 2/1967 | Hicks |
| 3,943,787 A | * | 3/1976 | Hicks ....................... 74/410 |
| 3,964,334 A | | 6/1976 | Hicks |
| 3,983,764 A | | 10/1976 | Hicks |
| 4,236,696 A | | 12/1980 | Hicks et al. |
| 4,616,520 A | | 10/1986 | Ehrlinger et al. |
| 4,882,950 A | | 11/1989 | Gausrab et al. |
| 5,494,358 A | | 2/1996 | Dougherty |
| 5,558,594 A | * | 9/1996 | Lefranc et al. .............. 475/347 |
| 6,024,851 A | | 2/2000 | Radhakrishnan |
| 6,099,432 A | * | 8/2000 | Shirokoshi ................ 475/331 |
| 2003/0008748 A1 | * | 1/2003 | Fox ......................... 475/346 |
| 2003/0123984 A1 | | 7/2003 | Wilde et al. |

FOREIGN PATENT DOCUMENTS

| | | |
|---|---|---|
| DE | 682354 | 10/1939 |
| DE | 2442588 | 3/1976 |
| DE | 19706686 | 8/1998 |
| EP | 0054280 | 6/1982 |
| JP | 57045636 | 3/1982 |
| WO | 03002891 A1 | 1/2003 |
| WO | WO03002891 | 1/2003 |

OTHER PUBLICATIONS

U.S. Appl. No. 10/481,708, filed Dec. 22, 2003, Fox.
Bedford, L.A.W., et al, The 3MW Wind Turbine Project on Orkney 1981-1995, 1996, Title Page, Fig. 1 and Section 9.

* cited by examiner

Primary Examiner—Roger Pang
(74) Attorney, Agent, or Firm—Polster, Lieder, Woodruff & Lucchesi, L.C.

(57) ABSTRACT

An epicyclic gear system has a sun gear, a ring gear, and planet gears between the sun and ring gears. In addition, it has a carrier including a carrier flange offset axially from the planet gears and carrier pins that project from the flange into the planet gears, each with a shank anchored to the flange, a head remote from the flange, and a groove between the shank and head. Between the planet gears and the carrier pins are bearings, each including an inner race and rollers between the inner race and planet gear. Whereas the carrier pins are cantilevered from the carrier flange, the inner races are cantilevered from the heads of the carrier pins. The grooves in the pins enhance pin deflection, so that the axes about which the planet gears rotate remain parallel to the central axis of the system.

20 Claims, 5 Drawing Sheets

EPICYCLIC GEAR SYSTEM

STATEMENT REGARDING FEDERALLY SPONSORED RESEARCH OR DEVELOPMENT

Not Applicable

BACKGROUND OF THE INVENTION

This invention relates in general to gear systems and, more particularly, to an epicyclic gear system.

The typical epicyclic or planetary gear system basically has a sun gear provided with external teeth, a ring gear provided with internal teeth, and several planet gears located between the sun and ring gears and having external teeth which mesh with the teeth on the sun and ring gears. In addition to its gears, the typical system has a carrier to which the planet gears are coupled. Either the sun gear, the ring gear, or the carrier is held fast, while power is delivered to and taken from the remaining two components, and thus power is transferred through the planetary system with a change in angular velocity and an inverse change torque.

The sun and ring gears for all intents and purposes share the same axis—a central axis—while the planet gears revolve about radially offset axes that are parallel to the central axis—or at least they should be. Often the offset axes and the central axis are not parallel, and as a consequence the planet gears skew slightly between sun and ring gears. This causes excessive wear along the teeth of the planet, sun and ring gears, generates friction and heat, and renders the entire system overly noisy.

The problem certainly exists in straddle-designed planetary carriers. With this type of carrier the pins on which the planet gears rotate extend between two carrier flanges in which the pins are anchored at their ends. The carrier experiences torsional wind up which causes one carrier flange to rotate slightly ahead of the other flange. Not only does this skew the pin for each of the planet gears such that one end lies circumferentially ahead of the other end, but it also causes the leading end of the pin to dip toward the central axis and the other end to draw away from the central axis. The end result is a poor mesh between the planet gears and the sun and ring gears, and of course the friction, wear and noise associated with poorly meshed gears. To counteract this tendency, some planetary systems rely on gears that are wider than necessary with lead correction and thus offer greater tolerance to skewing along the gear contact. But these systems can occupy excessive space and can be quite heavy.

Another type of epicyclic gear system uses a single flange carrier and a double cantilever arrangement at the pins for the planetary gears to insure that the planet gears and the sun and ring gears remain properly meshed. In this arrangement the single carrier flange is offset axially from planet gears, and the carrier pins project from that flange into, and indeed through, the planet gears. Each carrier pin has one end anchored in the carrier flange and at its other end is fitted within a sleeve which returns back over the pin, yet is spaced radially from the pin, to support the planet gear. U.S. Pat. No. 3,303,713 to R. J. Hicks shows a double cantilevered arrangement. Sometimes an antifriction bearing is fitted between the sleeve and the planet gear. But antifriction bearings consume space, making the planet gears excessively large in diameter, which in turn makes the entire gear system too large and heavy.

SUMMARY OF THE INVENTION

The present invention resides in an epicyclic gear system that has a sun gear, a ring gear located around the sun gear and at least one planet gear located between and engaged with the sun and ring gears. A carrier flange is offset axially from the planet gear and a carrier pin projects from it into the planet gear. An inner race is attached to the carrier pin remote from the carrier flange, and it has a raceway which is presented toward a raceway carried by the planet gear. Rolling elements are organized in a row between the opposed raceways to enable the planet gear to revolve about the carrier pin.

DETAILED DESCRIPTION OF INVENTION

Figure 1:
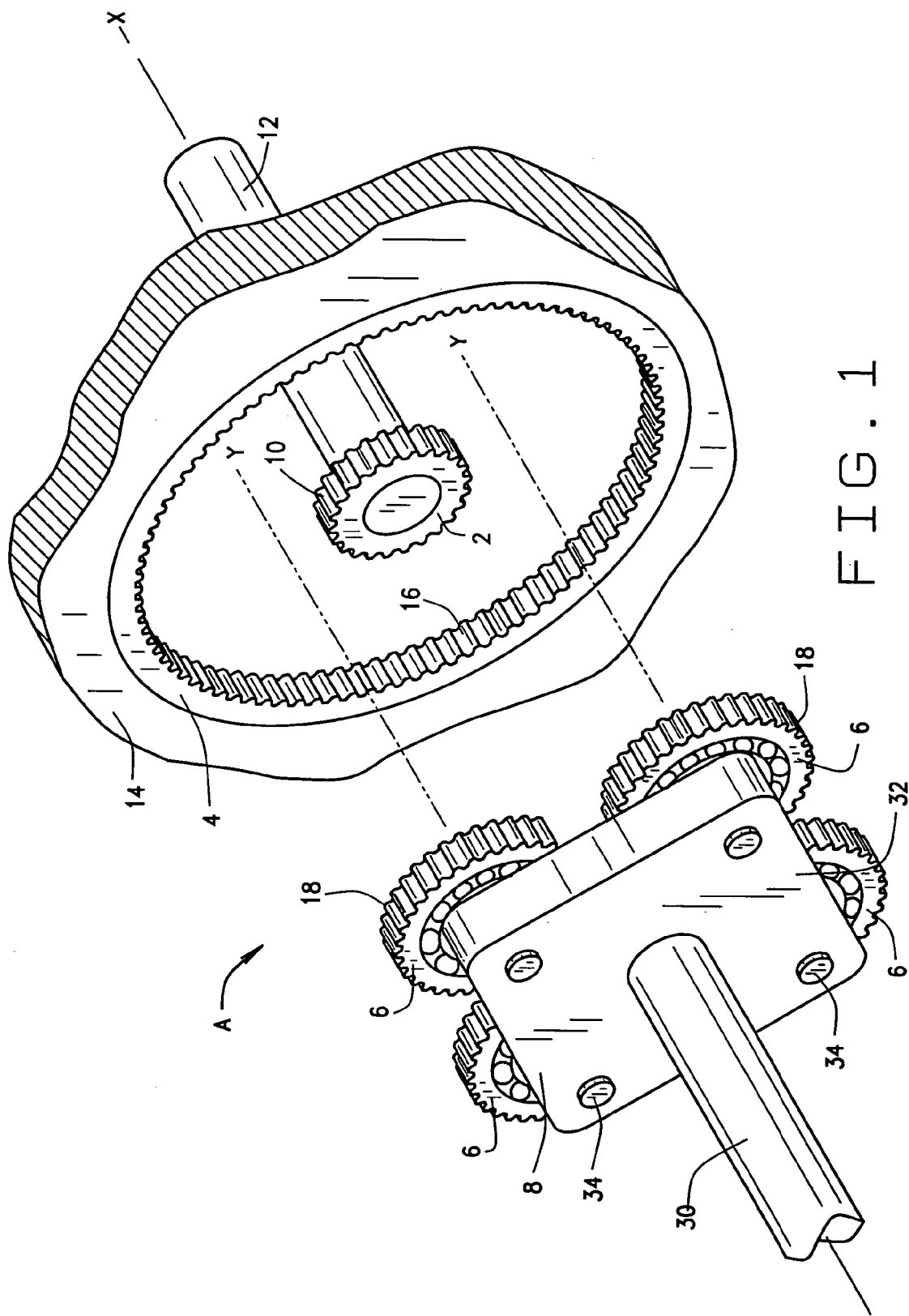
FIG. 1 is an exploded perspective view of an epicyclic gear system constructed in accordance with and embodying the present invention.

Referring now to the drawings, an epicyclic gear system A (FIG. 1), which is in effect a planetary transmission, has a sun gear 2, a ring gear 4 which surrounds the sun gear 2, and planetary gears 6 located between and engaged with the sun gear 2 and ring gear 4. In addition, the gear system A includes a carrier 8 on which the planet gears 6 rotate. The typical epicylic gear system has a sun gear, a ring gear, planet gears, and a carrier, but the gear system A is highly compact and for its size has a greater power density. Moreover, the planet gears 6 mesh better with the sun gear 2 and ring gear 6, causing less wear, diminishing friction, and reducing noise. The gear system A has a central axis X.

The sun gear 2 lies along the axis X with its center being the axis X. Thus, should it rotate, it will rotate about the axis X. It has external teeth 10 and is attached to a shaft 12 or some other supporting structure. The ring gear 4 surrounds the sun gear 2, with which it is concentric and thus shares the axis X. It is attached to a housing 14 or some other structure which may or may not rotate. Should it rotate, it will rotate about the axis X. It has internal teeth 16.

The planet gears 6 occupy the annular space between the sun gear 2 and ring gear 4 and have external teeth 18 which mesh with the teeth 10 of the sun gear 2 and the teeth 16 of the ring gear 4. They rotate about axes Y that are offset from, yet parallel to, the central axis X. Each planet gear 6 has (FIGS. 2 & 3) tapered raceways 20 and 22 which are presented inwardly toward its axis Y and taper downwardly toward an intervening surface between the small ends of the raceways 20 and 22. The large ends of the raceways 20 and 22 open out of the gear 6 at end faces 26 and 28 which extend out to the teeth 18 and may be squared off with respect to the axis Y.

The carrier 8 is attached to another shaft 30 (FIG. 1) or other structure, and has its center along the axis X. Should it rotate, it will rotate about the axis X. The carrier 8 includes a carrier flange 32 and carrier pins 34 (FIG. 2) which project all in the same direction from the flange 32, there being one pin 34 for each planet gear 6. More specifically, the carrier flange 32 lies opposite the end faces 26 of the planet gears 6, while the pins 34 project into the gears 6 to establish the axes Y about which the gears 6 rotate. The carrier flange 32 contains bores 36, with each pin 34 at one of its ends being fitted into one of the bores 36 with a interference fit and secured by a weld 38 at the very end of the pin 34 or otherwise attached firmly to the flange 32. Thus, the pins 34 have fixed ends which are anchored in the carrier flange 32 and free ends located remote from the carrier flange 32.

Actually, each pin 34 has (FIGS. 2 & 3) a shank 40 at and leading away from its fixed end, a head 42 at its free end, and an intervening segment 44 forming a groove 46 between the shank 40 and head 42. The shank 40 typically projects beyond the carrier flange 32 a distance equal to or slightly less than the length of the groove 46. It extends out of one of the bores 36 of the flange 32 and into the planet gear 6 for the pin 34 and has a cylindrical surface of uniform diameter. The head 42 also has a cylindrical surface of uniform diameter, and that diameter may be slightly greater than the diameter of the shank 40. While the head 42 may be somewhat shorter than the shank 40, it still is long enough to lie partially within the planet gear 6. The intervening segment 44 also possesses a cylindrical surface of uniform diameter, except at its ends where it merges into the shank 40 and the head 42 at fillets 48. That diameter, of course, is less than the diameters of the shank 40 and head 42.

The planet gears 6 rotate around their respective carrier pins 34 on antifriction bearings 50, each lying within its gear 6 and around its pin 34. Actually, each bearing 50 includes (FIGS. 2 & 3) the tapered raceways 20 and 22 on its planet gear 6. Each also includes an inner race 52 which is mounted on the head 42 of its pin 34 and projects over the pin 34 and into the gear 6. The inner race 52 includes a unitary race sleeve 54 and a separately formed rib ring 56 at one end of the sleeve 54. Also, each bearing 50 has tapered rollers 58 organized in two rows, one along the raceway 20 and the other along the raceway 22. The rollers 58 surround the inner race 52.

Figure 2:
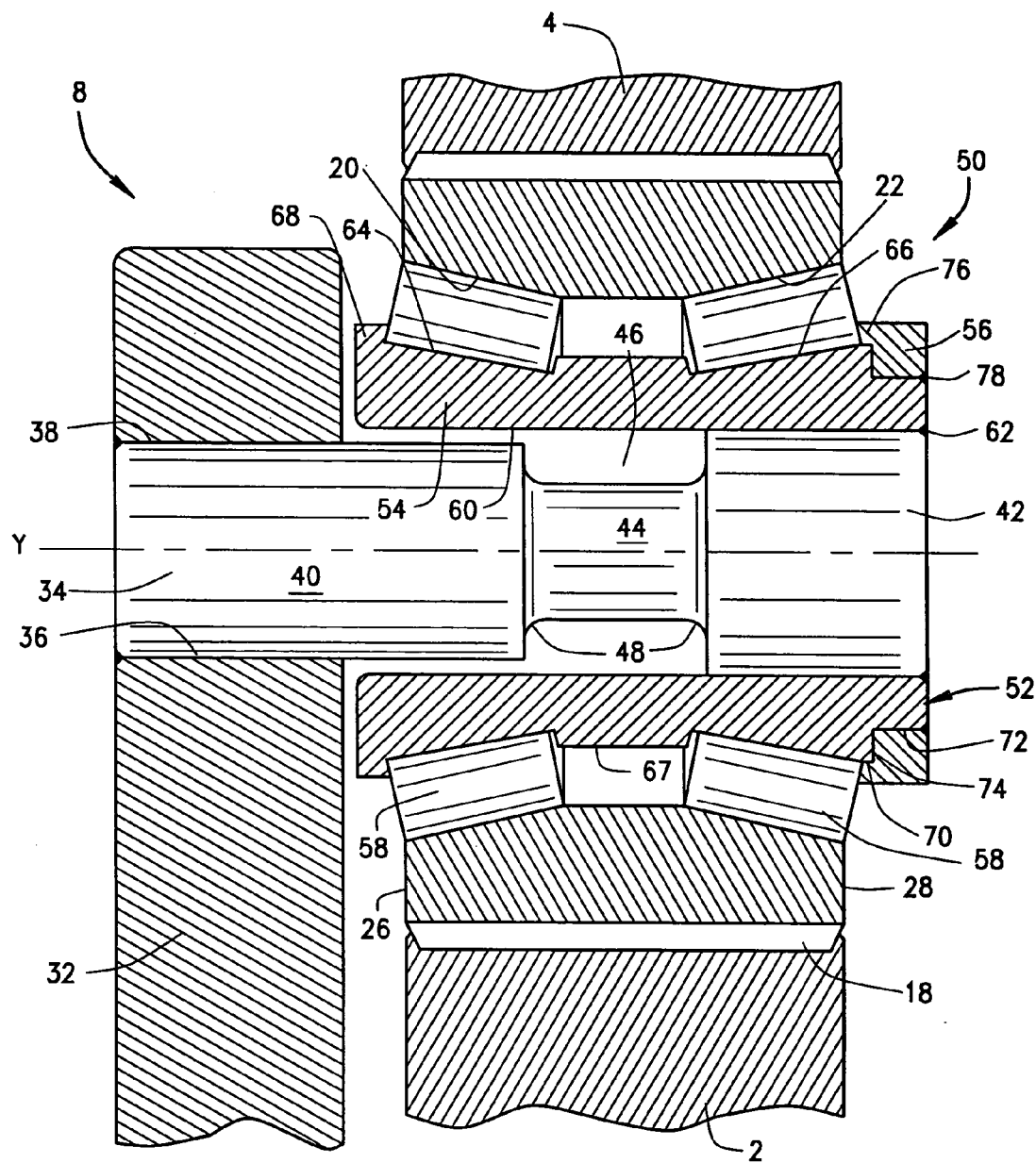
FIG. 2 is a fragmentary sectional view of the gear system at one of its planet gears.
Figure 3:
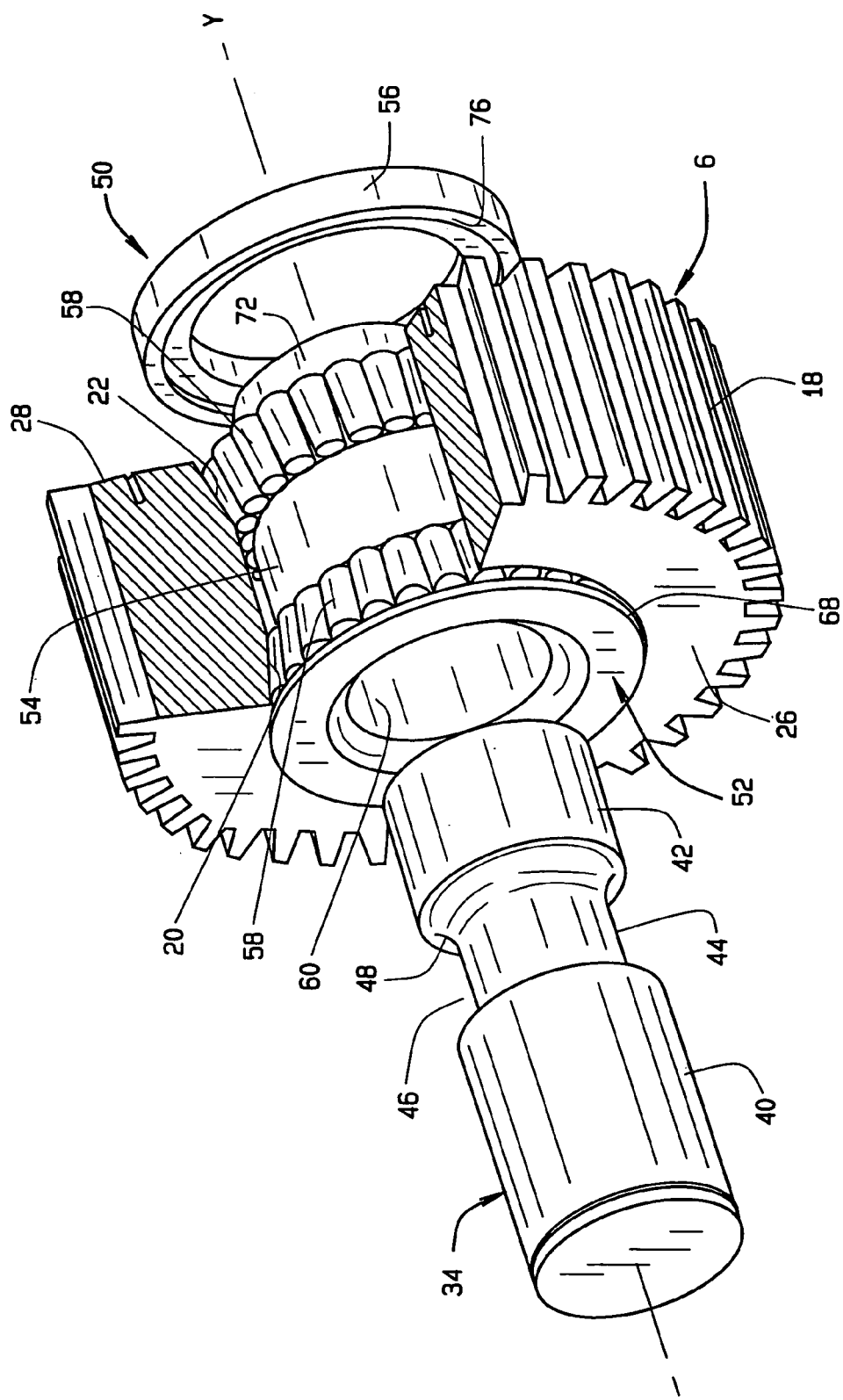
FIG. 3 is an exploded perspective view, partially broken away and in section, of one of the planet gears and the carrier pin and inner race for that planet gear.

Each carrier pin 34, being anchored in the carrier flange 32 at its fixed end and otherwise projecting beyond the flange 32, is cantilevered from the flange 32. The race sleeve 54 that surrounds the pin 34 is fitted to the head 42 at opposite or free end of the pin 34 and doubles back over the pin 34, so that the sleeve 54 and the inner race 52 of which it is apart is cantilevered from the free end of the pin 34. To this end, the race sleeve 54 has a through bore 60, which at its one end receives the enlarged head 42 on the pin 34. An interference fit exists between the head 42 and the surface of the bore 60 in the sleeve 54 and the end of the head 42 lies flush with the end of the sleeve 54. Here the pin 34 and sleeve 54 are joined together along a circular weld 62 (FIG. 2). Beyond the head 42 the surface of the bore 36 is spaced from the shank 40 of the pin 34, thus providing the second cantilever. The sleeve 54 projects through the interior of the planet gear 6 and here is provided with two tapered raceways 64 and 66, and an intervening surface 67 between the raceways 64 and 66. The raceway 64 is located farthest from the head 42, while the raceway 66 is located generally around the head 42, with its small diameter end and the beginning of the head 42 being at generally the same axial location. The raceway 64 is presented toward the raceway 20 on the gear 6 and tapers in the same direction, whereas the raceway 66 is presented toward the raceway 22 on the gear 6 and tapers in the same direction as that raceway. Thus, the two raceways 64 and 66, like the raceways 20 and 22, taper downwardly toward each other. The intervening surface 67 is larger than the small ends of the raceways 64 and 66 and enhances the rigidity of the sleeve 54. At the large end of the raceway 64, the race sleeve 54 has a thrust rib 68 which is formed as an integral part of the sleeve 54. It projects axially slightly beyond the end face 26 of the gear 6 and radially to provide a rib face along the large end of the raceway 20. The other raceway 66 at its large end merges into a short cylindrical surface 70 of no greater diameter. The surface 70, in turn, leads out to a rabbet in the opposite end of the sleeve 54, that rabbet being formed by a cylindrical end surface 72 of lesser diameter and a shoulder 74 located between the two cylindrical surfaces 70 and 72.

The rib ring 56 fits over the cylindrical surface 72 and against the shoulder 74. It projects radially outwardly past the other cylindrical surface 70 where it is provided with a rib 76 (FIG. 2) which projects axially over the cylindrical surface 70 to present a rib face at the large end of the raceway 66. The opposite ends of the rib ring 56 and the end face on the head 42 of the carrier pin 34 are generally flush, and here the rib ring 56 is joined to the sleeve 54 along another circular weld 78.

Both the race sleeve 54 and the rib ring 56 are formed from a low carbon bearing grade steel which is case carburized. Then the sleeve 54 may be ground along its end face out of which the rabbet opens and likewise the rib ring 56 may be ground along its corresponding end face, this to remove the hard case and expose the lower carbon core beneath it. Only after the hard case is removed in these areas, are the circular welds 62 and 78 made. On the other hand, one may mask these areas during the carburizing process to prevent carbon penetration, and thus eliminate the need for subsequent material removal.

Within each planet gear 6, the tapered rollers 58 occupy the annular space between the gear 6 and the inner race 52. Here they are organized in two rows—one between the raceways 20 and 64 and the other between the raceways 22 and 66. The rollers 58 that are between the raceways 20 and 64 have their tapered side faces in contact with those raceways—there being generally line contact—and their large end faces against the face of the integral thrust rib 68. The rollers 58 that lie between the raceways 22 and 66 along their tapered side faces are generally in line contact with those raceways, and along their large end faces contact the face of the rib 76 on the rib ring 56. The rollers 58 of each row are on apex, meaning that the conical envelopes in which their side faces lie have their apices at a common point along the axis Y. This produces pure rolling contact between the rollers 58 and the raceways 20, 22, 64, 68. Moreover, the bearing 50 is preferably set to light preload, so no clearances exist between the raceways 20 and 64 and their rollers 58 and the raceways 22 and 66 and their rollers 58, and this is perhaps best achieved by grinding a surface of the rib ring 56 so as to control the axial position of the rib face for the rib 76 on the ring 56. As a consequence of the preload, the axis Y remains stable with respect to the gear 6. However, the bearing 50 may be set with a slight end play, in which event clearances will exist in it.

In each row of rollers 58, a cage may separate the rollers 58 of that row, so that they do not contact each other. But the cage may be eliminated to increase the load capacity of the bearing 50 and thereby make the gear system A even more compact. When bearing 50 operates without a cage in its rows its rollers 58, adjacent rollers 58 can contact each other along their tapered side faces. To retard metal adhesion at contacting side faces, the rollers 58 along at least their tapered side faces should have a tribological coating that retards adhesion or at least every other roller 58 should have such a coating in it. One suitable coating includes particles of noncrystalline metal carbide and an amorphous hydrocarbon matrix in which the particles are embedded. The tribological coating may be applied to the rollers 70 by physical vapor deposition, by chemical deposition, or by a combination of the two. U.S. patent application Ser. No. 10/114,832, filed 2 Apr. 2002, for the invention of G. Doll and G. Fox entitled "Full Complement Antifriction Bearing", which invention is assigned to The Timken Company, discloses other tribological coatings, which will suffice for the rollers 70, and procedures for applying them. That application is incorporated herein by reference.

The assembly of the gear system A begins with the carrier 8, particularly the pin 34 and the race sleeve 54 of the inner race 52. The head 42 of the pin 34 is forced into the sleeve 54 from the ground end of the sleeve 54 until the end face of the head 42 is flush with ground end face of the sleeve 42. Thereupon, rollers 58 are installed along the raceway 64 of the race sleeve 54 to provide one row of rollers 58. Next the gear 6 is advanced over the sleeve 54 with its end face 26 leading. Its raceway 20 comes against the row of tapered rollers 58 that exists around the raceway 64. By rotating the gear 6 relative to the sleeve 54, the rollers 58 along their side faces seat along the raceways 20, 64 and further move up those raceways until their large end faces seat against the face of the integral thrust rib 68. This leaves the remaining raceways 22 and 66 exposed. More rollers 58 are installed between these raceways 22 and 26. With the rollers 58 of this row seated along the raceways 22 and 66, measurements are taken to determine the distance between the large end faces of those rollers 58 and a reference surface on the race sleeve 54. A rib ring 56 is selected having a rib 76 which positions the rollers 58 such that the bearing 50 has the desired preload or clearance in it. The rib ring 56 is installed over the cylindrical surface 72 on the race sleeve 54 and against the shoulder 74. While the rib ring 56 is held against the shoulder 74, the weld 78 is made, and the weld 62 may be made at this time as well. This completes the assembly of the bearing 50.

Once the bearing 50 is assembled and the pin 34 is attached at its head 42 to the inner race 52, the opposite end of the pin 34, which is on its shank 40, is forced into one of the bores 36 in the carrier flange 32. Indeed, each bore 36 in the flange 32 is fitted with a carrier pin 34 that supports a planet gear 6 and bearing 50 installed on the pin 34 in the same manner. With the carrier 8 complete, its planet gears 6 are fitted around and engaged with the sun gear 2 and also fitted into and engaged with the ring gear 4.

In the operation of the epicyclic gear system A, torque is applied to the carrier 8 at its shaft 30 and resisted by the planet gears 6 which engage the sun gear 2 and ring gear 4. Each carrier pin 34, being cantilevered from the carrier flange 32, deflects relative to the flange 32 under the torque. The inner race 52, being cantilevered from the pin 34 at is opposite end where the deflection of the pin 34 is the greatest, deflects in the opposite direction so as to compensate for the deflection caused by the pin 34. As a consequence of the two deflections, the axis Y for the planet gear 6 remains essentially parallel to the center axis X, and the planet gear 6 remains properly meshed with the sun gear 2 and ring gear 4. The groove 46 in the pin 34 facilitates the flexure of the pin 34 immediately before its head 42, and this enables the inner race 52 to achieve the correct deflection without extending the pin 34 and inner race excessively beyond the end face 28 of the planet gear 6. The two deflections afforded by the double cantilever enables the planet gears 6 to be shortened and the groove 46 prevents excessive projection of the pin 34 and inner race 52 beyond the gear 6. The presence of the outer raceways 20 and 22 on the gear 65 itself and the inner raceways on the race sleeve 54 which is attached directly to the pin 34 further contributes to the compactness of the system A.

The carrier pin 34, when provided with the groove 46, operates most effectively when the following dimensional relationships exist for a pin 34 formed from medium carbon, heat treated steel:

Diameter and length of the head 42 depends upon the bearing selection to support the tapered raceway 66.

Length of the groove 46 is usually 50 to 60 percent of the sum of the length of shank 40 beyond the carrier flange 32 and the length of the groove 46. This may vary due to the carrier flange 32 stiffness.

Diameter of the intervening segment 44 at the groove 46 is usually 70 to 71 percent of diameter shank 40, based on stress concentration factors.

Diameter of shank 40 is designed such that the maximum von Mises stress under the carrier flange 32 is below the infinite fatigue limit of the material during nominal loading conditions. This is typically dependent on the material properties, microstructure, strength, hardness and heat treatment. For example, in one case the stresses did not exceed 100-Mpa under nominal loading conditions for medium content alloy steel.

The radial gap between outer diameter of the shank 40 and inner diameter of the race sleeve 54 is greater than the radial deflection of the pin 34 at the extreme load conditions.

The diameter of the intervening surface 67 on the race sleeve 54 should be greater than the mean diameter of the raceways 64 and 66 to rigidify the sleeve 54.

The radius of the fillets 58 should reduce stress concentrations associated with an abrupt change in section as described in well-known textbook techniques. For example, the radius may be a value equal to half the difference between the outer diameter of shank 40 and outer diameter of intervening segment 44.

Width of carrier flange 32 is usually 90 to 150 percent of outer diameter of shank 40.

The geometry of the groove 46 is dependent upon the required radial deflection for improved load sharing of the planet gears 6 with the sun gear 2 and ring gear 4. Preferably the nominal deflection of the pin 34 along the axis Y should be greater than the backlash between the gears 2, 4 and 6 in the epicyclic system A under nominal loading, this to insure that the load is equalized among the planet gears 6 and over the widths of those gears 6.

Figure 4:
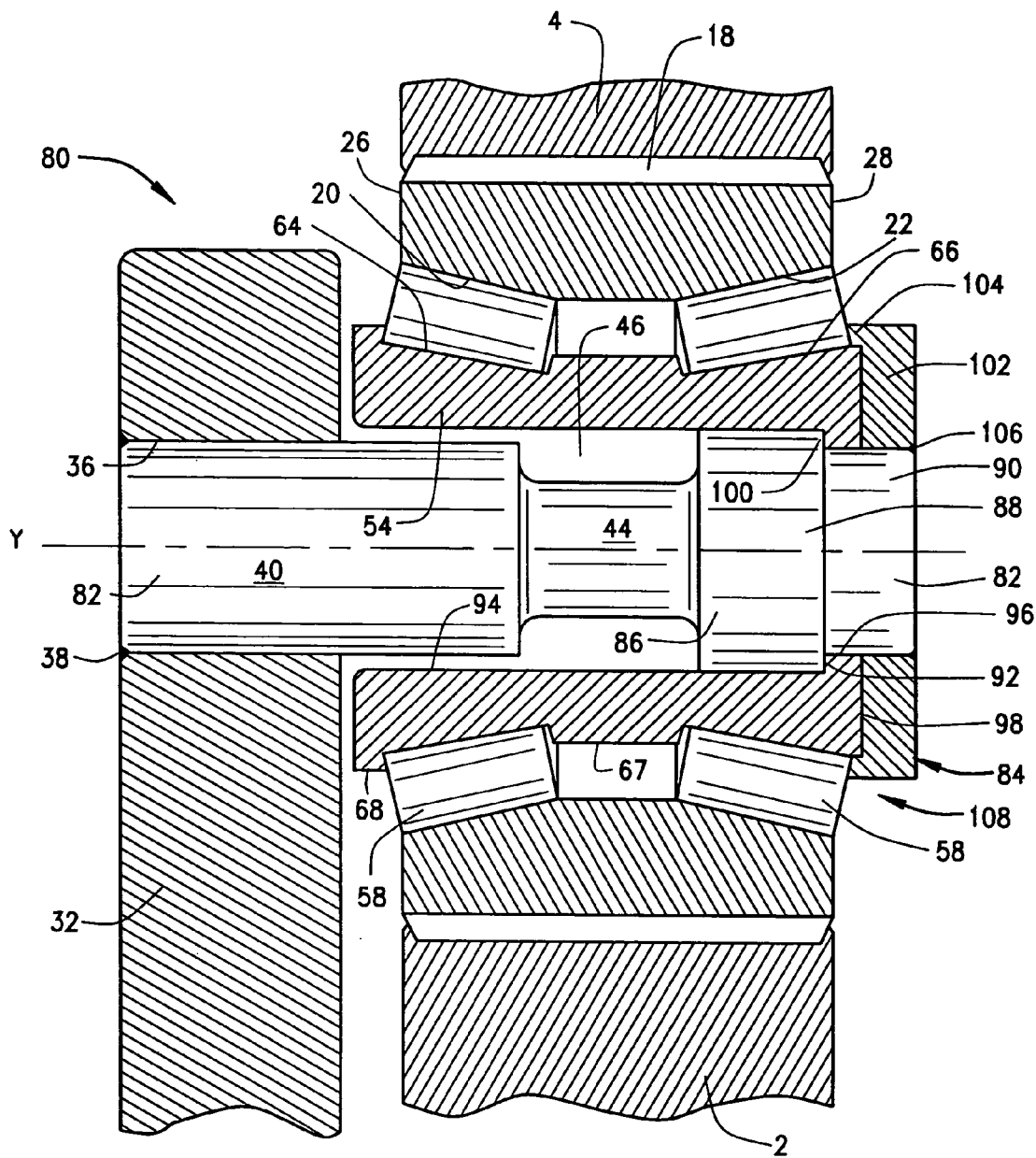
FIG. 4 is a fragmentary sectional view of the gear system similar to the system of FIG. 2, but with its carrier provided with a modified pin and rib ring.

Another carrier 80 (FIG. 4) likewise establishes axes Y about which planet gears 6 revolve, and it also has a carrier flange 32 provided with bores 36. However, the gears 6 rotate on modified carrier pins 82 and modified inner races 84.

Each pin 82 has a shank 40 and an intervening segment 44 beyond the shank 40 where it creates a groove 46 in the pin 82. Beyond the segment 44 and groove 46 the pin 82 has a modified head 86 provided with a large diameter surface 88 immediately beyond the groove 46 and a small diameter surface 90 extended beyond the large diameter surface 88 at a shoulder 92. The small diameter surface 90 leads out of the end of the pin 82.

The inner race 84 for each pin 82 has in its race sleeve 54 an elongated bore 94 which at one end opens out of the race sleeve 54 through the thrust rib 68 and at its other end opens into a short reduced bore 96 which opens out of an end face 98 at the opposite end of the sleeve 54. The two bores 94 and 96 are separated by a shoulder 100. The head 86 of the pin 82 fits through the elongated bore 94, there being an interference fit between the large diameter surface 88 of the head 86 and the surface of the bore 94. The head 86, at its small diameter surface 90 projects through the reduced bore 96 and beyond the end face 98 of the race sleeve 54. Indeed, the head 86 of the pin 82 is advanced through the elongated bore 94 of the race sleeve 54 until its shoulder 92 comes against the shoulder 100 in the race sleeve 54.

In addition, the modified inner race 84 has a modified rib ring 102 that fits around the small diameter surface 90 on the head 86 with an interference fit and bears against the end face 98. The rib ring 102 has a rib 104 which projects toward the integral thrust rib 68 and beyond the end face 98. The rib ring 102 is attached to the head 86 along a circular weld 106.

The race sleeve 54 for the modified inner race 84 has tapered raceways 64 and 66 which lead up to the thrust rib 68 and rib 104, respectively. One row of tapered rollers 58 lies between the raceway 64 on the inner race 84 and the raceway 20 in the patent gear 6 and another row of tapered rollers 58 lies between the raceways 22 and 66, all to form a bearing 108 that is set to preload.

The race sleeve 54 of the modified inner race 84 is formed from high carbon bearing grade steel that has been through hardened. The rib ring 102 is formed from low carbon bearing grade steel which has been case carburized. However, the case does not exist at the outer end of the race 84, it having been removed by grinding or, by reason of masking, having never formed, so that the weld 106 is made in the low carbon steel.

Figure 5:
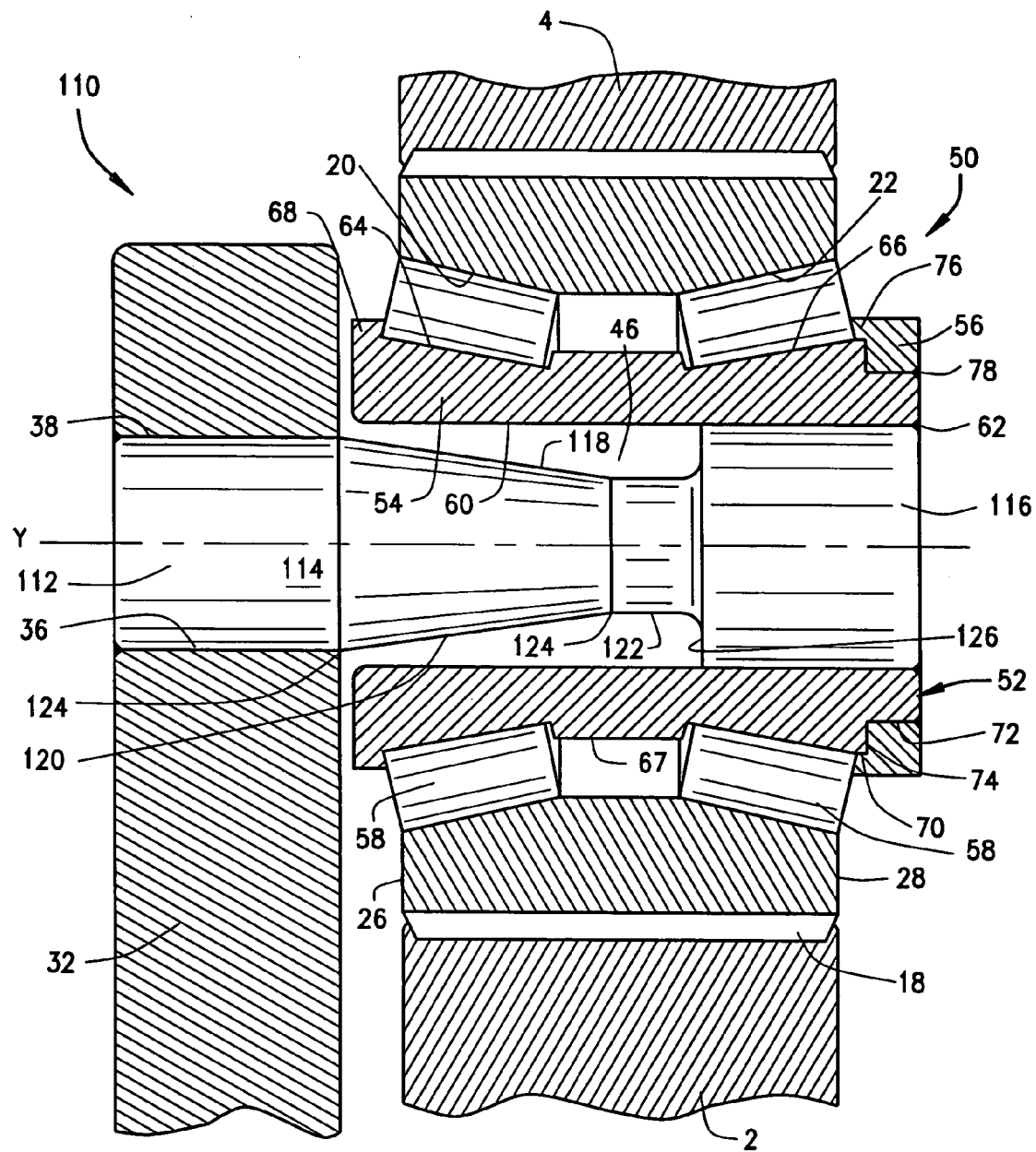
FIG. 5 is a fragmentary sectional view of the gear system similar to the system of FIG. 2, but with its carrier provided with a modified pin.

Still another carrier 110 (FIG. 5) is similar to the carriers 8 and 30 in that it supports planet gears 6 that rotate on bearings 50 including inner races 52 or 84. But the carrier 110 has a grooved pin 112 that differs somewhat from the grooved pins 34 and 82 of the carriers 8 and 30.

In this regard, the pin 112 has a shank 114 that lies entirely or almost entirely within the bore 36 of the carrier flange 32. Typically, the length of the shank 114 is equal to or less than the diameter of the carrier bore 36. The pin 112 also has a head 116 that fits within the through bore 60 of the race sleeve 54, to which it is secured by a weld 62 or 106. Between its shank 114 and its head 116, the pin 112 has a reduced intermediate segment 118 formed by a conical surface 120 and a cylindrical surface 122. The surfaces 120 and 122 produce the groove 46 in the pin 112. The conical surface 120 at its large end possesses a diameter equal to that of the shank 112 and here merges with the shank at a fillet 124. The surface 120 tapers downwardly away from the shank 114 and at its small end merges with the cylindrical surface 122 along another fillet 124. The cylindrical surface 122 extends toward the head 42 or 84, into which it merges along still another fillet 126. The section having the cylindrical surface 122 facilitates flexure circumferentially with respect to the axis X of the gear system A, whereas the section having the conical surface 120 facilitates flexure radially with respect to the axis X. The length of the conical surface 120 measured along the axis Y should be greater than one-half the distance between the faces of the thrust rib 68 and the rib ring 76. The length of the cylindrical surface 122, measured along the axis X, is typically one-half or less the length of the length of the conical surface 120, likewise measured along the axis X. The fillets 124 and 126 reduce stress concentrations associated with abrupt changes in diameter.

Actually the geometry of the intermediate segment 118, with its conical surface 120 and cylindrical surface 120 and fillets 124 and 126, is dependent upon the required radial deflection for improved load sharing of the planet gear 6 with the sun gear 2 and the ring gear 4. Preferably the nominal deflection of the pin 112 along the axis Y should be greater than the backlash between the gears 2, 4 and 6 in the epicyclic system A under nominal loading, this to insure that the load is equalized among the planet gears 6 and over the widths of those gears 6. The fillet radius 124 values are related to stress level capacity of the planet carrier 32 at the face of the carrier flange 32 from which the pin 112 emerges as well as the yield strength limit of the pin 112.

Variations are possible. For example, the rolling elements may be balls, in which event the raceways on the planet gears and on the inner races should conform in contour to them, yet remain oblique to the axis Y so as to accommodate thrust as well as radial loads. Also, the carrier pins 34 need not have the grooves 46, but instead the shank 40 of each may extend out to the head 42 or the head 86.

PARTS LIST
EPICYCLIC GEAR SYSTEM

| | |
|---|---|
| A | epicyclic gear system |
| X | axis |
| Y | axis |
| 2 | sun gear |
| 4 | ring gear |
| 6 | planet gears |
| 8 | carriers |
| 10 | external teeth |
| 12 | shaft |
| 14 | housing |
| 16 | internal teeth |
| 18 | external teeth |
| 20 | raceways |
| 22 | raceways |
| 26 | end face |
| 28 | end face |
| 30 | shaft |
| 32 | carrier flange |
| 34 | carrier pin |
| 36 | bores |
| 38 | weld |
| 40 | shank |
| 42 | head |
| 44 | intervening segment |
| 46 | groove |
| 48 | fillets |
| 50 | bearing |
| 52 | inner race |
| 54 | race sleeve |
| 56 | rib ring |
| 58 | tapered rollers |
| 60 | through bore |
| 62 | weld |
| 64 | tapered raceway |
| 66 | tapered raceway |
| 67 | intervening surface |
| 68 | thrust rib |
| 70 | short cylindrical surface |
| 72 | cylindrical surface |
| 74 | shoulder |
| 76 | rib |
| 78 | weld |
| 80 | modified carrier |
| 82 | pin |
| 84 | inner race |
| 86 | head |
| 88 | large diameter surface |

-continued

PARTS LIST
EPICYCLIC GEAR SYSTEM

| | |
|---|---|
| 90 | small diameter surface |
| 92 | shoulder |
| 94 | elongated bore |
| 96 | reduced bore |
| 98 | end face |
| 100 | shoulder |
| 102 | rib ring |
| 104 | rib |
| 106 | weld |
| 108 | bearing |
| 110 | modified carrier |
| 112 | pin |
| 114 | shank |
| 116 | head |
| 118 | intermediate segment |
| 120 | conical surface |
| 122 | cylindrical surface |
| 124 | fillets |
| 126 | fillets |

What is claimed is:

1. An epicyclic gear system comprising:
a sun gear located along a central axis;
a ring gear located around the sun gear and sharing the central axis with the sun gear;
at least one planet gear located between and engaged with the sun and ring gears for rotation about an offset axis, the planet gear having two raceways that are tapered and presented toward the offset axis, the raceways being oblique to the axis and tapered downwardly toward each other so that they are closest at their small ends;
a carrier coupled to the planet gear and including a carrier flange located beyond one end of the planet gear, the carrier also including a carrier pin that extends from the carrier flange, along the offset axis, through the planet gear and has a shank at which it is secured to the carrier flange, an intermediate segment extended from the shank, and a head attached to the intermediate segment and projecting radially beyond the intermediate segment, whereby the pin is cantilevered from the carrier flange;
an inner race attached to the head of the pin and extended back over, yet is spaced from, the intermediate segment of the pin, so that the inner race is cantilevered from the pin, the inner race being within the planet gear and including a race sleeve that fits over and is fastened to the head of the pin, the race sleeve being provided with two raceways that are tapered and oblique to the offset axis and are presented away from the offset axis and toward the raceway on the planet gear, one of the inner raceways being located within and inclined in the same direction as one of the outer raceways, the other of the inner raceways being located within and inclined in the same direction as the other of the outer raceways so that the inner raceways are closest at their small ends, the race sleeve further having a thrust rib at its one end where the rib is located at the large end of one of the inner raceways, the inner race also including an initially separate rib ring which is located at the opposite end of the race sleeve and has a thrust rib located at the large end of the other inner raceway; and
tapered rollers organized in two rows between and contacting the outer raceways of the planet gear and the inner raceways of the inner race.

2. A gear system according to claim 1 wherein the race sleeve is welded to the head of the carrier pin and the initially separate rib ring is welded to the race sleeve.

3. A gear system according to claim 2 wherein the race sleeve is formed from case carburized steel.

4. A gear system according to claim 1 wherein head has a large and small segment, with the large segment being closest to the shank; wherein the race sleeve has a bore which receives the large segment of the head on the pin and a reduced bore which receives the small segment of the head on the pin; and wherein the rib ring fits over the small segment of the head on the pin and captures the sleeve on the pin.

5. A gear system according to claim 4 wherein the race sleeve as formed from through hardened steel.

6. A gear system according to claim 1 wherein the intermediate section has a cylindrical surface that forms the bottom of essentially the entire groove.

7. A gear system according to claim 1 wherein the intermediate segment has a conically shaped surface that leads away and tapers downwardly from the shank.

8. A gear system according to claim 7 wherein the intermediate segment also has a cylindrical surface that leads away from the small end of the conical surface and extends toward the head.

9. An epicyclic gear system comprising:
a sun gear located along a central axis;
a ring gear located around the sun gear and sharing the central axis with the sun gear;
at least one planet gear located between and engaged with the sun and ring gears for rotation about an offset axis, the planet gear carrying a raceway that is presented toward the offset axis;
a carrier coupled to the planet gear and including a carrier flange located beyond one end of the planet gear, the carrier also including a carrier pin that extends from the carrier flange through the planet gear and has a shank at which it is anchored in the carrier flange and a head located beyond the carrier flange and a groove separating the shank and the head, such that the pin is cantilevered from the carrier flange,
an inner race which is attached to the head of the pin and extended back over, yet spaced from, the pin at the groove, such that the inner, race is cantilevered from the pin, the inner race being within the planet gear where it is provided with a raceway that is presented away from the offset axis and toward the raceway on the planet gear; and
rolling elements organized in a row between and contacting the raceways of the planet gear and inner race.

10. A gear system according to claim 9 wherein the raceway on the planet gear is one of two outer raceways which are located oblique to the offset axis and are inclined in opposite directions; wherein the raceway on the inner race is a one of two inner raceways that are oriented oblique to the offset axis and inclined in opposite directions, one of the inner raceways being located within and inclined in the same direction as one of the outer raceways and the other inner raceway being located within and inclined in the same direction as the other outer raceway; and wherein the rolling elements are arranged in two rows between the outer and inner raceways.

11. A gear system according to claim 10 wherein the raceways are tapered; wherein the outer raceways taper downwardly toward each other, so that they are closest at their small ends; wherein the inner raceways taper downwardly toward each other so that they are closest; at their small ends; and wherein the rolling elements are tapered rollers.

12. A gear system according to claim 11 wherein the inner race includes a race sleeve that fits over and is fastened to the bead of the pin; and has the two inner raceways and also a thrust rib at one end of the sleeve where it is at the large end of one of the inner raceways; and wherein the inner race also includes an initially separate rib ring which fits against the opposite end of the sleeve and has thrust rib located at the large end of the other inner raceway.

13. An epicyclic gear system comprising:
a sun gear located along a central axis;
a ring gear located around the sun gear and sharing the central axis;
at least one planet gear located between and engaged with the sun gear and ring gear;
a carrier flange located beyond one end of the planet gear;
a carrier pin extended from the carrier flange and through the planet gear along an offset axis, such that it is cantilevered on the flange, and including a shank at which the pin is anchored on the flange and a head located beyond the shank, the pin having an annular groove located between the shank and the head; and
a bearing located between the pin and the planet gear and including an inner race attached to the head of the pin and extended over, yet spaced from the pin at the groove such that the inner race is cantilevered from the head of the pin, the inner race having an inner raceway that is presented outwardly away from the offset axis, the bearing also including an outer raceway carried by the planet gear and presented inwardly toward the inner raceway, the bearing further including rolling elements located between and contacting the inner and outer raceways.

14. A gear system according to claim 13 wherein the outer raceway is one of two outer raceways which are located oblique to the offset axis and are inclined in opposite directions; wherein the inner raceway is one of two inner raceways that are oriented oblique to the offset axis and inclined in opposite directions, one of the inner raceways being located within and inclined in the same direction as one of the outer raceways and the other inner raceway being located within and inclined in the same direction as the other outer raceway; and wherein the rolling elements are arranged in two rows between the outer and inner raceways.

15. A gear system according to claim 14 wherein the raceways are tapered; wherein the outer raceways taper downwardly toward each other, so that they are closest at their small ends; wherein the inner raceways taper downwardly toward each other so that they are closest at their small ends; and wherein the rolling elements are tapered roller.

16. A gear system according to claim 14 wherein the inner race includes a race sleeve that fits over and is fastened to the head of the pin and has the two inner raceways on it and also a thrust rib at one end of the sleeve where the rib is at the large end of one of the inner raceways; and wherein the inner race also includes an initially separate rib ring which is located at the opposite end of the race sleeve and has a thrust rib located at the large end of the other inner raceway.

17. A gear system according to claim 16 wherein the race sleeve is welded to the head of the carder pin and the initially separate rib ring is welded to the race sleeve.

18. A gear system according to claim 16 wherein the head has large and small segments with the large segment being closest to the shank: wherein the race sleeve has a bore which receives the large segment of the head on the pin and a reduced bore which receives the small segment of the head on the pin; and wherein the rib ring fits over the small segment of the head on the pin and captures the sleeve on the pin.

19. A gear system according to claim 13 in which the bottom of the groove is formed substantially in its entirety by a cylindrical surface located between the shank and the head.

20. A gear system according to claim 13 in which the bottom of the groove is formed by a conical surface leading away from the shank, from which it tapers downwardly, and a cylindrical surface leading from the small end of the conical surface to the head.

* * * * *

UNITED STATES PATENT AND TRADEMARK OFFICE
CERTIFICATE OF CORRECTION

PATENT NO.   : 6,994,651 B2                                              Page 1 of 1
DATED        : February 7, 2006
INVENTOR(S)  : Gerald P. Fox and Eric Jallat It is certified that error appears in the above-identified patent and that said Letters Patent is hereby corrected as shown below:

Column 10,
Line 44, after "inner" delete ",".

Column 11,
Line 1, after "closest" delete ";".
Line 6, replace "bead" with -- head --.

Column 12,
Line 11, replace "roller." with -- rollers. --; and after "shank" replace ":" with -- ; --.
Line 21, replace "carder" with -- carrier --.

Signed and Sealed this

Twenty-fifth Day of April, 2006

JON W. DUDAS
*Director of the United States Patent and Trademark Office*